United States Patent
Petratou et al.

(10) Patent No.: US 11,813,762 B2
(45) Date of Patent: Nov. 14, 2023

(54) RAZOR HANDLES

(71) Applicant: Bic Violex S.A., Anoixi (GR)

(72) Inventors: Maria Petratou, Athens (GR); Georgios Paspatis, Athens (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 17/252,911

(22) PCT Filed: Jul. 30, 2019

(86) PCT No.: PCT/EP2019/070518
§ 371 (c)(1),
(2) Date: Dec. 16, 2020

(87) PCT Pub. No.: WO2020/025623
PCT Pub. Date: Feb. 6, 2020

(65) Prior Publication Data
US 2021/0187766 A1     Jun. 24, 2021

(30) Foreign Application Priority Data

Jul. 31, 2018 (EP) .................................... 18186683

(51) Int. Cl.
    *B26B 21/52*        (2006.01)
    *F16M 13/00*      (2006.01)
    *B26B 21/40*        (2006.01)

(52) U.S. Cl.
    CPC ............ *B26B 21/523* (2013.01); *B26B 21/52* (2013.01); *B26B 21/521* (2013.01);
(Continued)

(58) Field of Classification Search
    CPC ... B26B 21/4062; B26B 21/52; B26B 21/521; B26B 21/522; B26B 21/523;
(Continued)

(56) References Cited

U.S. PATENT DOCUMENTS 354,196 A * 12/1886 Kampfe et al. ......... B26B 21/52
                                                           30/47
1,290,018 A * 12/1918 Goodwin ................ B26B 21/52
                                                           30/531
(Continued)

FOREIGN PATENT DOCUMENTS

AT            524037 B1 * 2/2022 ............. A46B 15/00
CN       202021623 U     11/2011
(Continued)

OTHER PUBLICATIONS

International Search Report and Written Opinion in corresponding Application No. PCT/EP2019/070518, dated Oct. 29, 2019, (13 pages).

*Primary Examiner* — Jason Daniel Prone
(74) *Attorney, Agent, or Firm* — Bookoff McAndrews, PLLC

(57) ABSTRACT

The present application is related to a razor handle including a top portion for connection to a blade assembly and a bottom portion with a flexible element reversibly deformable between a first configuration and a second configuration, where the flexible element presents, in the second configuration, a broader footprint than in the first configuration, for supporting the razor handle upright.

11 Claims, 4 Drawing Sheets

(52) U.S. Cl.
CPC ....... *F16M 13/005* (2013.01); *B26B 21/4062* (2013.01); *B26B 21/528* (2013.01)

(58) Field of Classification Search
CPC ...... B26B 21/527; F16M 13/005; B25G 1/04; B25G 1/06; B25G 1/08; A46B 15/0097
USPC .................. 30/47–51, 526–536; D28/46–48; D4/101, 104
See application file for complete search history.

(56) References Cited

U.S. PATENT DOCUMENTS

| | | | | |
|---|---|---|---|---|
| 1,548,164 | A * | 8/1925 | Parker | B26B 21/523 30/526 |
| 1,749,051 | A * | 3/1930 | Watt | B26B 21/523 D28/48 |
| 1,870,924 | A * | 8/1932 | Platzer | B43K 23/04 248/688 |
| 1,875,990 | A * | 9/1932 | Christman | B26B 21/523 30/526 |
| 1,961,236 | A * | 6/1934 | Merrick | B26B 21/521 30/527 |
| 1,966,307 | A * | 7/1934 | Ohmer | B26B 21/523 30/534 |
| 2,010,304 | A * | 8/1935 | Hyatt | B26B 21/10 30/331 |
| 2,298,944 | A * | 10/1942 | Hyatt | B26B 21/00 30/526 |
| 2,356,173 | A * | 8/1944 | Monnet | B26B 21/34 30/83 |
| D140,654 | S * | 3/1945 | Cotton | D28/46 |
| 2,387,765 | A * | 10/1945 | Monnet | B26B 21/52 30/534 |
| D145,021 | S * | 6/1946 | Evans | D28/46 |
| D164,287 | S * | 8/1951 | De Bacco et al. | D28/46 |
| 2,669,017 | A * | 2/1954 | Seko | B26B 21/40 30/535 |
| 2,794,246 | A * | 6/1957 | Marsh et al. | B26B 21/06 D28/46 |
| 3,111,757 | A | 11/1963 | Dubofsky | |
| D205,588 | S * | 8/1966 | Pomper | D28/46 |
| 3,413,720 | A * | 12/1968 | Mullen | B26B 21/06 30/526 |
| D242,085 | S * | 10/1976 | Maloney et al. | D28/48 |
| 4,208,703 | A * | 6/1980 | Orr | F16M 13/005 362/322 |
| 4,272,886 | A * | 6/1981 | Asano | B26B 21/52 30/535 |
| 4,638,560 | A * | 1/1987 | Higashi | B26B 21/523 30/47 |
| D301,402 | S * | 6/1989 | Hirsch | A46B 5/00 D4/108 |
| D306,916 | S * | 3/1990 | Wasserman | D28/48 |
| D310,580 | S * | 9/1990 | King | D28/46 |
| 5,819,413 | A * | 10/1998 | Kerbrat | B26B 21/523 30/526 |
| 5,839,198 | A | 11/1998 | McCoy | |
| D408,997 | S * | 5/1999 | Holland | A46B 5/00 D4/108 |
| 5,911,480 | A * | 6/1999 | Morgan | B26B 21/523 30/526 |
| 6,076,223 | A * | 6/2000 | Dair | A46B 15/0097 15/167.1 |
| 6,094,768 | A * | 8/2000 | Hugon | A46B 5/00 D4/104 |
| 6,170,113 | B1 * | 1/2001 | Cornu | A46B 5/00 248/688 |
| 6,698,065 | B2 * | 3/2004 | Lauer | A46B 15/0097 16/DIG. 12 |
| 6,907,638 | B2 * | 6/2005 | Katz | A46B 5/00 248/688 |
| 7,389,781 | B2 * | 6/2008 | Kemp | A46B 15/0061 132/308 |
| 7,556,385 | B2 * | 7/2009 | Kitahara | F16M 13/005 353/122 |
| D603,096 | S * | 10/2009 | Greene | D28/46 |
| D605,362 | S * | 12/2009 | Andersen | D28/48 |
| D612,540 | S * | 3/2010 | Joslin | D28/48 |
| D623,800 | S * | 9/2010 | Clemons | D28/46 |
| 7,917,986 | B2 * | 4/2011 | Jimenez | A46B 15/0097 15/167.1 |
| 8,403,288 | B2 * | 3/2013 | Cheng | F16M 13/005 248/673 |
| 8,869,442 | B2 * | 10/2014 | Moody | F16M 13/005 42/72 |
| 9,308,658 | B2 * | 4/2016 | Coviello | B26B 21/523 |
| 9,521,899 | B1 * | 12/2016 | Tai | A46B 15/0036 |
| D776,876 | S * | 1/2017 | Coviello | D28/48 |
| D783,900 | S * | 4/2017 | Coviello | D28/48 |
| 9,713,879 | B2 * | 7/2017 | Samuels | B26B 21/523 |
| 10,052,774 | B2 * | 8/2018 | Giannelli | B26B 21/523 |
| 10,061,348 | B2 * | 8/2018 | Shen | F16M 13/005 |
| 10,251,473 | B2 * | 4/2019 | Nguyen | A46B 15/0097 |
| 10,797,743 | B1 * | 10/2020 | Sessions | F16M 13/04 |
| 10,960,563 | B2 * | 3/2021 | Brellis | B26B 21/52 |
| 11,369,191 | B2 * | 6/2022 | Zwimpfer | A46B 15/0097 |
| 2002/0100134 | A1 * | 8/2002 | Dunn | A46B 15/0097 15/167.1 |
| 2004/0163979 | A1 * | 8/2004 | Bender | A47K 1/09 206/361 |
| 2008/0110025 | A1 * | 5/2008 | Bucalo | B26B 21/523 30/526 |
| 2009/0277023 | A1 * | 11/2009 | Coelho | B26B 21/527 30/526 |
| 2010/0050357 | A1 * | 3/2010 | Misner | A46B 15/0097 15/167.1 |
| 2012/0192429 | A1 | 8/2012 | Savarese | |
| 2014/0123420 | A1 * | 5/2014 | Nanda | A46B 15/00 15/105 |
| 2016/0081465 | A1 * | 3/2016 | Metter | A46B 15/0097 15/167.1 |
| 2016/0296003 | A1 * | 10/2016 | Beckerman | A46B 15/0097 |
| 2016/0368157 | A1 | 12/2016 | Giannelli et al. | |
| 2017/0036361 | A1 | 2/2017 | Bushell | |
| 2017/0303674 | A1 * | 10/2017 | Nguyen | A46B 15/0097 |
| 2018/0125225 | A1 * | 5/2018 | Wainless | A46B 15/0097 |
| 2022/0016795 | A1 * | 1/2022 | Gratsias | B26B 21/52 |
| 2022/0024061 | A1 * | 1/2022 | Christofidellis | B26B 21/52 |

FOREIGN PATENT DOCUMENTS

| | | | | |
|---|---|---|---|---|
| CN | 202726956 | u | 2/2013 | |
| DE | 29613102 | U1 | 10/1996 | |
| EP | 0419755 | A1 * | 4/1991 | .......... F16M 13/005 |
| EP | 1975504 | A2 * | 10/2008 | .......... F16M 13/005 |
| GB | 545789 | A | 6/1942 | |
| GB | 628855 | A | 9/1949 | |
| GB | 2493409 | A * | 2/2013 | ......... A46B 15/0097 |
| KR | 20090008690 | U * | 8/2009 | ......... A46B 15/0097 |
| KR | 20100003428 | U * | 3/2010 | ............ A46B 15/00 |
| KR | 200466235 | Y1 * | 4/2013 | ............ A46B 15/00 |
| KR | 20140005502 | U * | 10/2014 | ............ A46B 15/00 |
| WO | WO-2014073878 | A1 * | 5/2014 | ......... A46B 15/0097 |
| WO | WO-2020025623 | A1 * | 2/2020 | ........... B26B 21/521 |

* cited by examiner

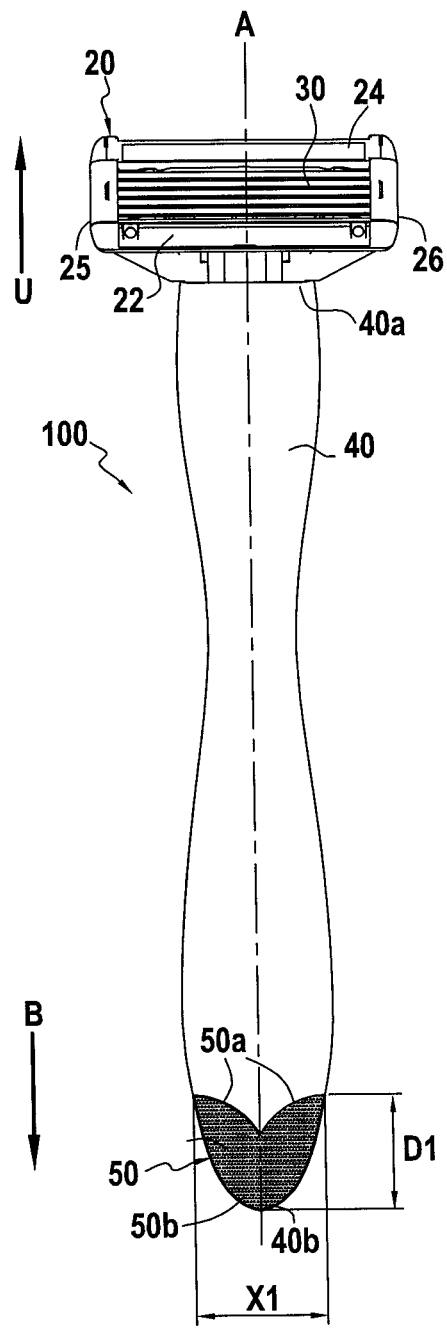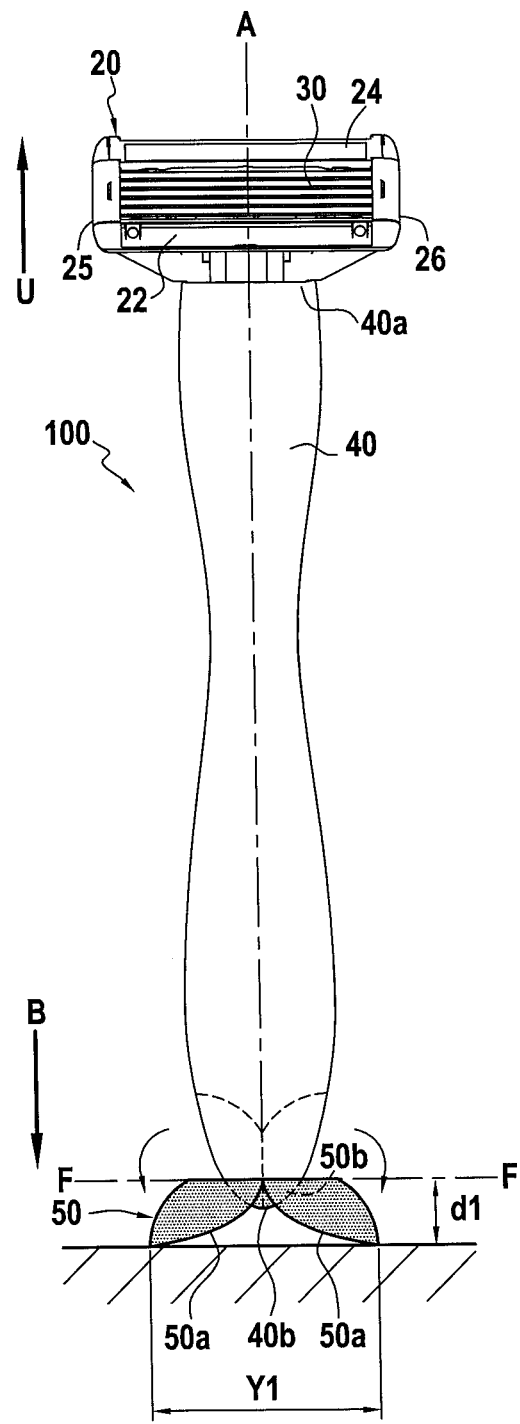

RAZOR HANDLES

This application is a National Stage Application of International Application No. PCT/EP2019/070518, filed on Jul. 30, 2019, now published as WO/2020/025623 and which claims priority to European patent application EP 18186683.1 filed on Jul. 31, 2018, entitled "RAZOR HANDLES".

The present disclosure relates to a razor handle, and more specifically, to a razor handle comprising a handle and a flexible element that is adapted to support the handle. Additionally, a razor may include the razor handle and blade assembly including at least one blade. The blade assembly may be fixed or detachable from the handle. The blade assembly may be interchangeable, in particular, when a blade or blades of the blade assembly have been blunted. The razor may be specifically adapted for shaving facial, head, and/or body hair.

BACKGROUND

Two common problems with shaving blade assemblies is storage of the razor and, at the same time, keeping a high level of hygiene. For example, shaving blade assemblies that require a tray are common, however the trays are difficult to store due to their bulky size and can leave the razor blade in a pool of still water due to the orientation of the blade within the tray, especially if the tray is left in a location where water is present, e.g., the shower. Therefore, there is a need for a structure that allows the razor blade to be hygienically and easily stored.

To address this problem, shaving blade assemblies comprising a mechanism to orient and hold the razor upright have been developed. For example, U.S. Pat. No. 5,839,198 A discloses a razor comprising a pair of fold down legs which are extended from pivots on the handle. Each leg has a foot section at lower end by which the razor is maintained in a standing position when the legs are in an outward position. The foot sections are accommodated in a notch in the handle when the legs are in the inward position. The legs can be made of plastic or metal.

Another example is U.S. Pat. No. 3,111,757 A which discloses a ball-like balancing part formed of rubber that has a socket to receive the shaving blade assembly.

Another example is US 2017/0036361 A1 which discloses a razor having a triangular shaped handle. The base naturally stands upright when not in use, thereby keeping the blade from making direct contact with wet surfaces for extended periods of time.

SUMMARY

To address the problems of storing a razor easily and, at the same time, keeping a high level of hygiene, the present disclosure according to claim 1 is provided.

In particular, a razor handle may comprise a top portion for connection to a blade assembly and a bottom portion with a flexible element reversibly deformable between a first configuration and a second configuration. The flexible element may present, in the second configuration, a broader footprint than in the first configuration, the broader footprint being configured for supporting the razor handle upright.

This configuration allows the handle or razor to be easily stored on a flat surface, for example, to fully dry after a wet shave. Additionally, this configuration allows the flexible element to have a slender profile and a small footprint, so it can be stored on a surface with limited available space. When a user is finished with the shaving and desires to store it in a confined space, such as a medicine cabinet or a toiletry bag, the razor or handle can simply be toggled into the first configuration. This easily transformative configuration eliminates the need for a tray.

The flexible element may comprise an elastomer. The elastomer allows the flexible element to be easily moved between the first and second configurations. Additionally, elastomers are easy to clean and are known to resist bacterial growth. Furthermore, elastomers have a high fatigue life and thus permit the user to move the flexible element between the first and second configurations a multitude of times without breaking or cracking.

The flexible element may have one or more fold lines. This fold line provides a predetermined collapsible point that makes it easier for the user to properly balance the handle or shaving blade assembly.

The flexible element may extend towards the top portion of the handle in the first configuration and may extend away from the top portion of the handle in the second configuration. These two configurations aid in having the handle or razor by easily stored in an upright position to dry or in a compact position for storing in a confined space.

The flexible element may have a plurality of fold lines distributed such that the flexible element adopts a stepped profile. These fold lines provide a set of predetermined collapsible points that make it easier for the user to properly balance the handle or shaving blade assembly.

The flexible element may have at least two legs. The legs make it easier for the user to properly balance the handle or shaving blade assembly.

The flexible element may be injection molded with the bottom portion of the handle. The injection molding process facilitates the manufacturing of the handle or shaving blade assembly. The handle and flexile element can be molded in one or more molding steps. Further, the injection molding process can permit the flexible element to be attached to the handle, for example, the handle having a notched cavity and the flexible element being molded to fill the notched cavity.

The flexible element extends from a first to a second end, wherein the second end is fixed to a bottom portion of the handle and the first end extends farther away from the top portion of the handle when in the second configuration, than in the first configuration. This deformation of the flexible element allows the razor to be stored in an upright position when in the second configuration.

The handle may include a first cavity that may house a spring and a latch mechanism. Positioning the spring and latch mechanism inside of a cavity formed in the handle facilitates storing the razor.

The spring and latch mechanism may be configured to move the flexible element between the first and second configurations. This configuration allows a user to easily transition the flexible element between the first and second configurations.

The latch mechanism may be adapted to slidably connect with one or more grooves formed on a surface defining the first cavity. Configuring the handle to have a groove that interfaces with the latch mechanism allows for the assembly to have fewer components.

The latch mechanism may be selectively latched with the grooves within the first cavity by compressive pressure being applied to the spring. This configuration allows a user to easily transition the flexible element between the first and second configurations.

The flexible element may form a second cavity configured to form a fluid tight enclosure with the bottom of the handle.

This configuration allows the engagement assembly to be protected from any fluids that may compromise it, for example repeated exposure to water may deteriorate a metal spring if it is included in the engagement assembly.

In other aspects, a razor may comprise the razor handle and a blade assembly configured to be attached to the top portion of the razor handle. It is contemplated that the handle, with or without a blade assembly attached thereto, can be moved with between the first and second configurations and that the flexible element can support either the handle or the handle with the blade assembly attached thereto in an upright position.

In aspects, a method of configuring a razor handle to be stored in an upright position may comprise providing a handle comprising a top portion for connection to a blade assembly and a bottom portion with a flexible element reversibly deformable between a first configuration and a second configuration, wherein the flexible element presents, in the second configuration, a broader footprint than in the first configuration, for supporting the razor handle upright. This method facilitates hygienic and efficient storage of a razor and/or razor handle.

The above summary is not intended to describe each and every implementation of the concept. In particular, selected features of any illustrative embodiment within this disclosure may be incorporated into additional embodiments unless clearly stated to the contrary.

BRIEF DESCRIPTION OF THE DRAWINGS

The disclosure may be more completely understood in consideration of the following detailed description of aspects of the disclosure in connection with the accompanying drawings, in which:

FIG. 1A is a perspective view of a razor according to a first example when the flexible element is in a first configuration;

FIG. 1B is a perspective view of a razor according to the first example when the flexible element is in a second position;

Figure 2A:
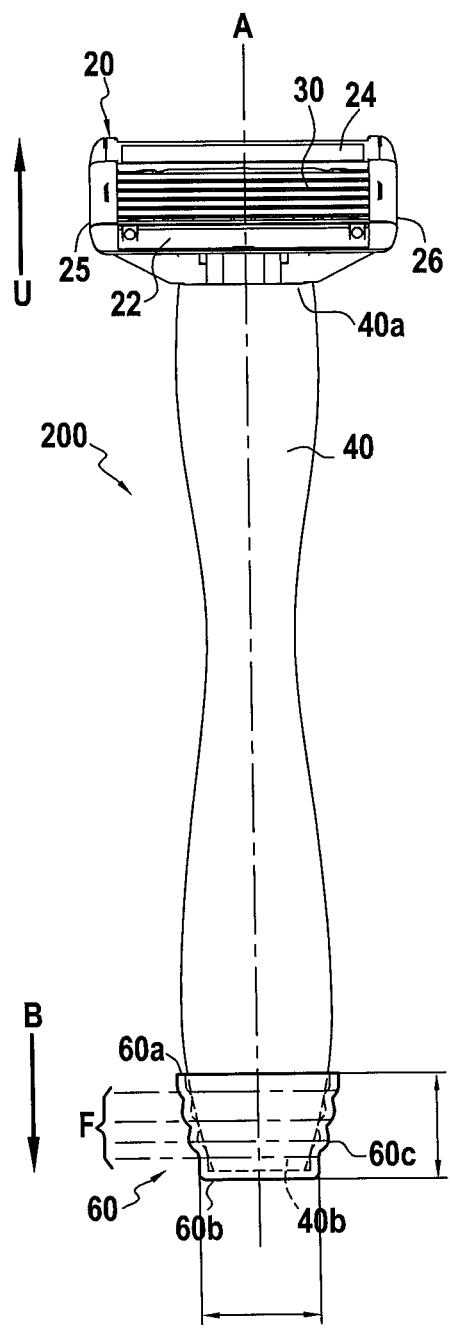
FIG. 2A is a perspective view of a razor according to a second example when the flexible element is in a first configuration.

While aspects of the disclosure are amenable to various modifications and alternative forms, specifics thereof have been shown by way of example in the drawings and will be described in detail. It should be understood, however, that the intention is not to limit aspects of the disclosure to the particular embodiment described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the present disclosure. The illustrative aspects depicted are intended only as exemplary.

FIG. 1 is a perspective view of a razor 100 having a blade assembly, handle 40, and flexible element 50. The blade assembly may have a housing 20 that may be hollow and generally form a rectangular parallelepiped; however, the housing 20 may be any other suitable shape.

Secured within the housing 20 is at least one blade 30. In this embodiment, a plurality of blades 30 are shown, however, it is contemplated that the blade assembly may have any number of blades 30. Additionally, the blades 30 that are shown are elongate in shape; however, it is contemplated that the blades 30 may be formed into any other suitable shape. Additionally, each blade may be one piece, bent to form an angle, or may comprise a blade support attached on it.

The housing 20 may also include a guard bar 22, a cap 24, and a pair of substantially c-shaped retainers 25, 26 each having a top portion, a bottom portion, a substantially convex portion connecting the top and bottom portions, where the retainers 25, 26 are adapted to retain the position of the blades 30 within the housing 20. The retainers may extend along a pair of side edges of the housing 20 and are spaced apart and positioned on opposite sides of the housing 20. The retainers 25, 26 may be either integral with the housing or a separate component assembled with the housing.

The shaving blade assembly 100 further includes an elongated handle 40 extending along a vertical central axis A-A. The handle has a top portion 40 a and a bottom portion 40 b. The handle 40 may be shaped to better adapt to the natural contours of a hand. The top portion 40 a of the handle 40 may have a connecting member (not shown) that is adapted to connect to the housing 20 of the blade assembly. The blade assembly may be monolithically formed with the handle 40, it may be fixed to the handle 40, or it may be interchangeable with the handle 40.

The razor 40 may further include a flexible element 50. The flexible element 50 has a first end 50a and a second end 50b. The second end 50b may be attached to the bottom portion 40b of the handle 40. This may be achieved by any suitable means including but not limited to fasteners, injection molding, press-fit, etc. The flexible element 50 may be formed of any appropriate material permitting the flexible element to elastically bend, for example, an elastomer such as a polysiloxane. The thickness of the exposed portions of the flexible element 50 may vary or may be uniform. The flexible element 50 may be formed as a paraboloid. The flexible element 50 may be formed to adapt to the contours of the handle 40.

As can be seen in FIG. 1A, the flexible element 50 is in a first, collapsed, configuration. In this configuration, the handle 40 or razor 100 has a smaller footprint with a width X1 perpendicularly to the vertical central axis A-A, for example 10-30 mm, in examples 20 mm, facilitating its storage. A length D1 of the flexible element 50 in the collapsed configuration may be measured along the axis A-A. This length D1 may be 10-40 mm, in examples 15 mm. As can be seen in FIG. 1B, the flexible element 50 is in a second, deployed, configuration. In this configuration, the handle 40 can be balanced on the first end 50a of the flexible element 50, which is folded along a fold line F-F, such that the handle 40 can stand in an upright position. In this configuration, the handle 40 or razor 100 can easily stand on a flat surface, for example, to fully dry after a wet shave. In this configuration, the handle 40 or razor 100 has a larger footprint with a larger width Y1 perpendicularly to the vertical central axis A-A. For example, Y1 may be 10-45 mm, in examples 30 mm. A length d1 of the flexible element 50 in this deployed configuration may be shorter than the length D1 in the collapsed configuration. For example, the length d1 may be 5-18 mm, in examples 10 mm.

The flexible element 50 can be formed to take any suitable shape, for example, formed as a cup, formed to have two or more legs, or formed to appear like a flower. In the case where the flexible element 50 is formed as having legs, the legs may be formed on the first end 50a which is the opposing end from the second end 50b that is attached to the bottom portion 40b of the handle 40. Thus, the legs 50a, 50b may be adapted to be manipulated such that the flexible element 50 can be moved between the first and second configurations.

Figure 2B:
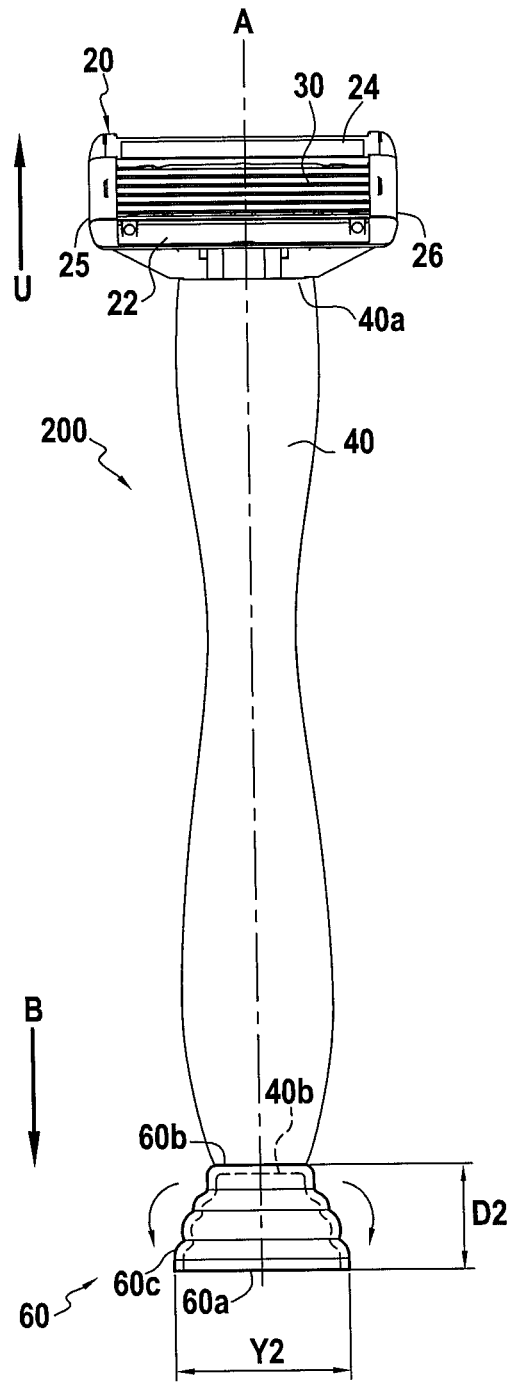
FIG. 2B is a perspective view of a razor according to the second example when the flexible element is in a second position.

FIGS. 2A-2B show a razor 200 according to a second example. The razor 200 is the same as the razor 100 except for the flexible element 60. Therefore, the detailed description of similar features will be omitted and like reference numerals will be used.

The flexible element 60 has a first end 60a and a second end 60b. The second end 60b may be attached to the bottom portion 40b of the handle 40 by any suitable means including but not limited to fasteners, co-injection molding, press-fit, etc. The flexible element 60 may be formed of any appropriate material permitting the flexible element to elastically bend, for example, an elastomer.

The thickness of the exposed flexible element 60 may vary. The flexible element 60 may be formed so as to have at least one fold line 60c. The flexible element 60 may have a plurality of fold lines F-F. The thickness of the flexible element 60 along the fold line 60c may be the minimum thickness and may be less than the thickness of the flexible element not on the fold line 60c. The fold line 60c may operate as a predetermined collapsible region. The flexible element 60 may have a plurality of fold lines 60c. The distance between the fold lines may be 2.5-10 mm, in examples 5 mm.

The flexible element 60 can be formed in any suitable shape, for example as a cup. The flexible element 60 may form a paraboloid when in a first, collapsed, configuration or in a second, use, configuration. The flexible element 60 may be formed to have a stepped profile where the steps are formed by the fold lines 60c. The flexible element 60 may be formed to adapt to the contours of the handle 40.

As can be seen in FIG. 2A, the flexible element 60 is in a first, collapsed, configuration. In this configuration, flexible element 60 extends from the bottom portion 40b of the handle 40 towards the top portion 40a of the handle 40. This configuration reduces the footprint of the handle 40 having a width X2 perpendicularly to the vertical central axis A-A, for example, 10-30 mm, in examples 15 mm, facilitating its storage. A length D2 of the flexible element 60 in the collapsed configuration may be measured along the axis A-A. This length D2 may be 10-40 mm, in examples 15 mm.

As can be seen in FIG. 2B, the flexible element 60 is in a second, collapsed, configuration in which the flexible element 60 is unfolded at the at least one fold line 60c. In this configuration, flexible element 60 extends from the bottom portion 40b of the handle 40 and away from the top portion 40a of the handle 40. In this configuration, the handle 40 can be balanced on the first end 60a of the flexible element 60 such that the handle 40 can stand in an upright position. Additionally, the handle 40 with the blade assembly connected thereto may be balanced in an upright position using the flexible element 60. In this configuration, the handle 40 or razor 100 has a larger footprint with a larger width Y2 perpendicularly to the vertical central axis A-A. For example, Y2 may be 15-45 mm, in examples 30 mm. A length d2 of the flexible element 60 in this deployed configuration may be shorter than the length D2 in the collapsed configuration. For example, the length d2 may be 5-18 mm, in examples 10 mm.

In this configuration, the razor 200 can easily be stored on a flat surface, for example, to fully dry after a wet shave.

FIGS. 3A-3D show a razor 300 according to a third example. The razor 300 is the same as the blade assemblies 100 and 200 except for the flexible element 70, an engagement assembly 80, and the first and second cavities C1, C2 formed in the bottom portion 40b of the handle 40. Therefore, the detailed description of similar features will be omitted and like reference numerals will be used.

The razor 200 has a blade assembly including a housing 20 that may have at least one blade 30, an elongated handle 40 extending along a vertical central axis A-A that may be attached to the housing 20, the handle 40 may have a flexible element 70 attached to the bottom portion 40b, and an engagement assembly 80 that may be disposed within the handle 40 and flexible element 70.

The flexible element 70 has a first end 70a and a second end 70b. The second end 70b may be attached to the bottom portion 40b of the handle 40 by any suitable means including but not limited to fasteners, co-injection molding, press-fit, etc. The flexible element 70 may be formed of any appropriate material permitting the flexible element 70 to elastically bend, for example, an elastomer.

The thickness of the flexible element may be uniform or may vary. The flexible element may be formed so as to have at least one fold line 70c, wherein the flexible element 70 is thinner along the fold line 70c than elsewhere. Therefore, the fold line 70c may operate as a predetermined collapsible region. The flexible element 70 may have a plurality of fold lines 70c.

The flexible element 70 can be formed in any suitable shape, for example as a cup. The flexible element 70 may form a cylinder when in a first, vertically extended, configuration. The flexible element 70 may form a frustum when in a second, laterally extended, configuration.

Figure 3A:
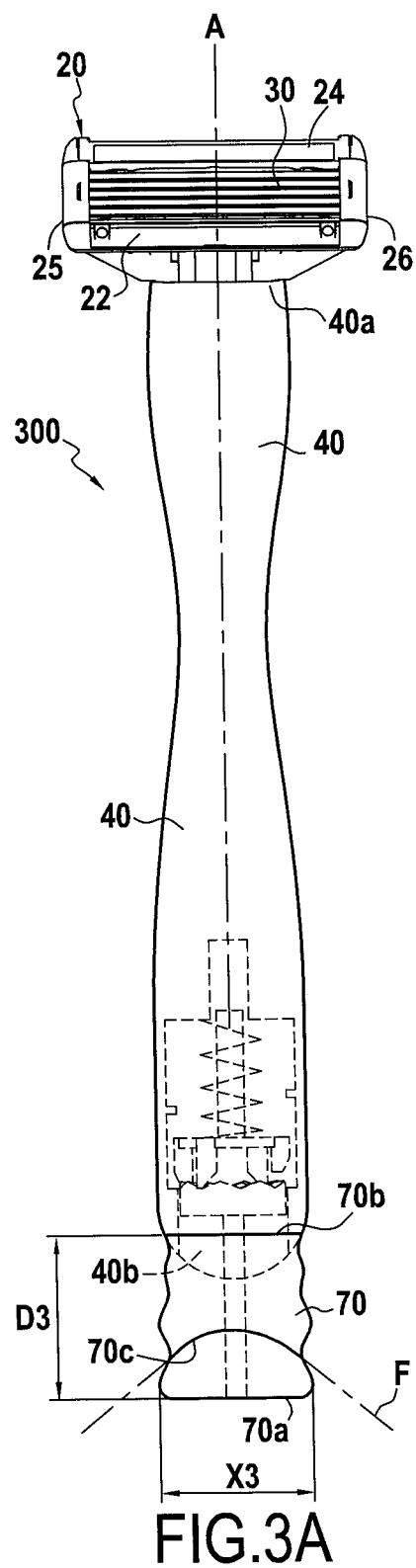
FIG. 3A is a perspective view of a razor according to a third example when the flexible element is in a first configuration.

FIG. 3A shows the razor when the flexible element 70 is in the first, vertically extended, configuration. In this configuration, the flexible element 70 extends from the bottom portion 40b of the handle 40 and away from the top portion 40a of the handle 40. This configuration makes the handle 40 or razor 300 easy to store because of the slender profile of the handle 40 and flexible element 70. In this configuration, the handle 40 or razor 100 has a smaller footprint with a width X3 perpendicularly to the vertical central axis A-A of, for example, 8-30 mm, in examples 15 mm. A length D3 of the flexible element 70 in the vertically extended configuration may be measured along the axis A-A. This length D3 may be 10-40 mm, in examples 25 mm.

Figure 3B:
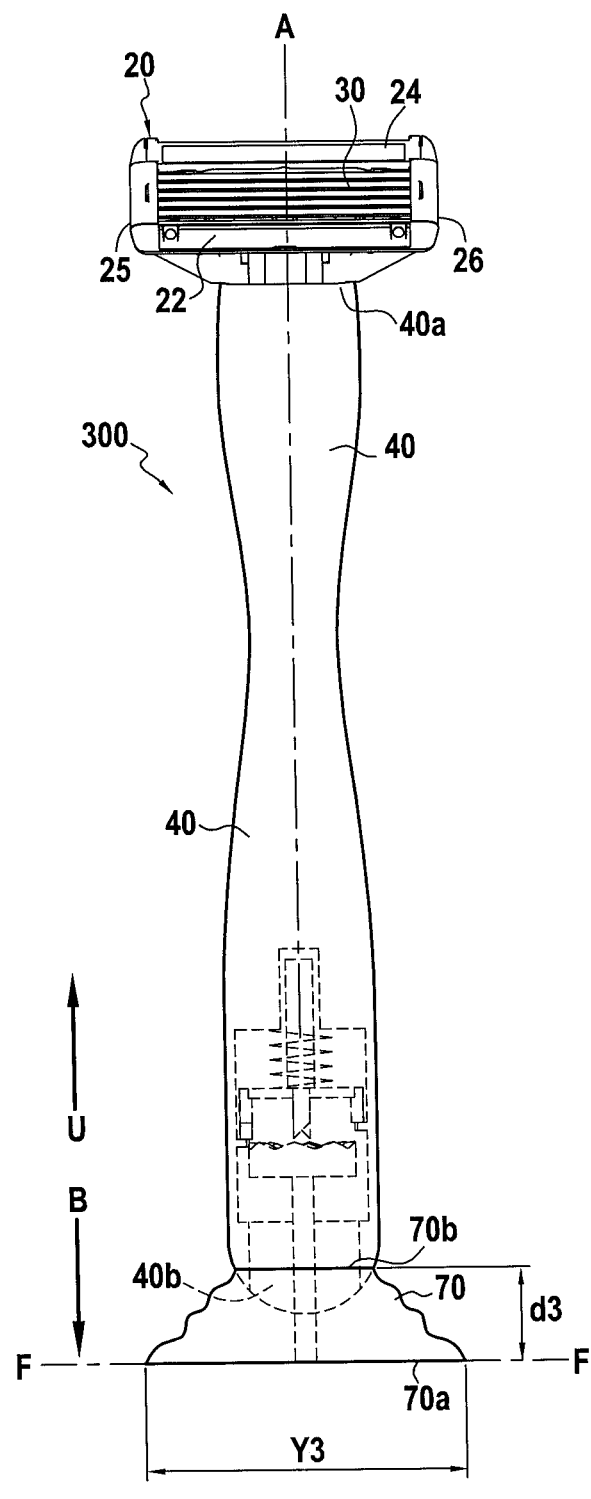
FIG. 3B is a perspective view of a razor according to the third example when the flexible element is in a second position.

As can be seen in FIG. 3B, the flexible element 70 is in a second, laterally extended, configuration. In this configuration, at least one fold line 70c may be utilized, which is shown corresponding to a fold line F-F. As can be seen, flexible element 70 extends from the bottom portion 40b of the handle 40 and laterally away from the vertical central axis A-A. In this configuration, the handle 40 can be balanced on the first end 70a of the flexible element 70 such that the handle 40 can stand in an upright position. Additionally, the handle 40 with the housing 20 connected thereto may be balanced in an upright position using the flexible element 70. In this configuration, the handle 40 or razor 100 has a larger footprint with a larger width Y3 perpendicularly to the vertical central axis A-A. For example, Y3 may be 15-45 mm, in examples 30 mm. A length d3 of the flexible element 70 in this deployed configuration may be shorter than the length D3 in the laterally extended configuration. For example, the length d3 may be 5-25 mm, in examples 15 mm.

This configuration allows the razor 300 to be easily stored on a flat surface, for example, to fully dry after a wet shave. Additionally, the flexible element 70 has a slender profile and can be stored on a surface with limited available space.

Figure 3D:
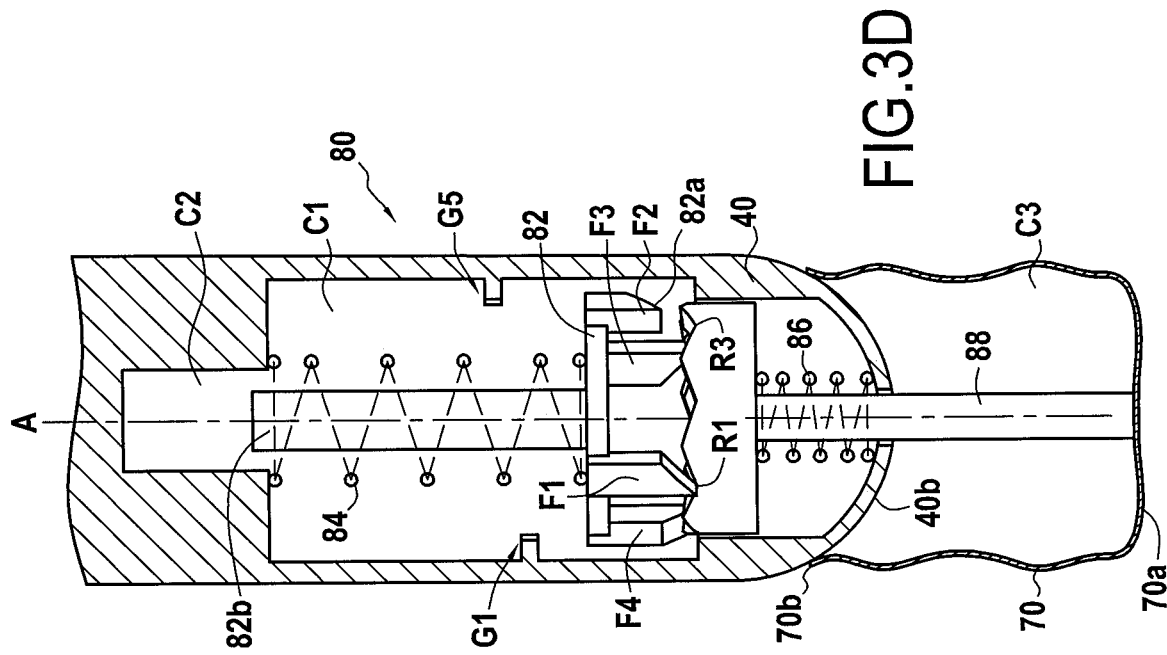
FIG. 3D is a cross-section of the razor according to the third example showing the engagement assembly disposed within the handle when the flexible element is in the second position.
Figure 3C:
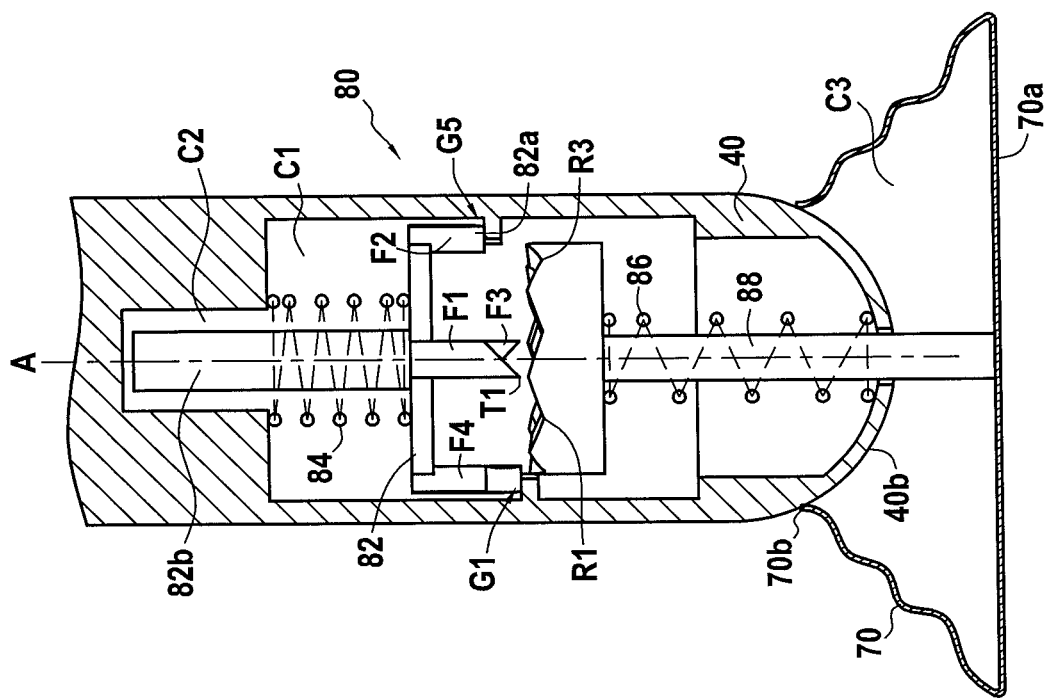
FIG. 3C is a cross-section of the razor according to the third example showing the engagement assembly disposed within the handle when the flexible element is in the first configuration.

Turning to FIGS. 3C and 3D, to enable the razor to move between the first and second configurations, the razor 300 comprises an engagement assembly 80. The engagement assembly 80 may be disposed along the vertical central axis A-A within first and second cavities C1, C2 in the handle 40 and within a cavity C3 formed by the flexible element 70. The handle 40 and flexible element 70 may be joined together such that their respective cavities C1-C3 form an enclosure. This enclosure may be fluid tight.

The surface of the first handle cavity C1 may be formed as a cam having a plurality of grooves G1-G8. Four of the grooves G1, G3, G5, G7 may have the same dimensions and extend partially along the surface of the first handle cavity C1 in a vertical direction that is parallel to the vertical central axis A-A. Each of these grooves G1, G3, G5, G7 may have an angled termination position T1, T3, T5, T7 which may be at an angle α relative to the vertical central axis A-A, wherein this angle α may be 20-60 degrees, in examples 45 degrees. These groves G1, G3, G5, G7 may be considered as "short grooves."

The remaining grooves G2, G4, G6, G8 may have the same dimensions and extend substantially along the surface of the first handle cavity C1 in a vertical direction that is parallel to the vertical axis A-A. These grooves may be considered as "long grooves."

For example, four of the grooves G1, G3, G5, G7 (short grooves) may extend along a smaller fraction of the vertical length of the first handle cavity C1 and the grooves G2, G4, G6, G8 (long grooves) may extend over a larger fraction of the vertical length of the first handle cavity C1. A difference ΔL in the vertical length of the short and long grooves may be 2-10 mm, in examples 5 mm.

It is envisioned that the surface of the first handle cavity C1 may have any number of grooves and is not limited to eight. The grooves G1-G8 may be disposed in an alternating pattern on the surface of the first handle cavity C1. For example, the pattern may be a short groove, followed by a long groove, followed by a short groove, and so on.

Turning to the engagement assembly 80, which may be disposed within the enclosure formed by the handle 40 and flexible element 70, may be connected to a top end 40e of the first handle cavity C1 and a lower end 70e of the flexible element 70.

The engagement assembly 80 may include a follower 82 having head portion 82a and a shaft portion 82b, a spring 84, and a push button 88.

The head portion 82a of the follower 82 may have a set of four vertical flanges F1-F4 thereon. Each of the flanges F1-F4 may have the same dimensions and extend partially along and beyond the upper exterior surface of the head portion 82a in a vertical direction parallel to the vertical central axis A-A. The tips of the flanges F1-F4 may be at an angle β of, for example, 30-60 degrees, in examples 45 degrees, relative to vertical central axis A-A. These flanges F1-F4 may be dimensioned and positioned to correspond to a respective groove G1-G8 formed in the first handle cavity C1. For example, the four vertical flanges F1-F4 may be dimensioned and positioned to correspond with each of the short grooves G1, G3, G5, G7. It is envisioned that the head portion 82a may have any number of flanges and is not limited to four.

The shaft portion 82b of the follower 82 may have a smaller radial distance relative to the vertical central axis A-A than the head portion 82a. The shaft portion 82b of the follower 82 may be rotatably connected to or rotatable relative to the top end 40e of the first handle cavity C1. Further, the shaft portion 82b may be disposed partially within the second handle cavity C2.

The engagement assembly 80 may further include a spring 84 that is disposed around the shaft portion 82b of the follower 82. One end of the spring may be configured to contact the top end 40e of the first handle cavity C1 and the opposing end of the spring 84 may be configured to contact the head portion 82a of the follower 82. The spring 84 may have a smaller radial distance from the central axis A-A than the head portion 82a. In this configuration, the spring 84 is adapted to urge the head portion 82a toward the bottom portion 40b of the handle 40.

The engagement assembly 80 further includes a push button 88 having a head portion 88a and a shaft portion 88b. The head portion 88a may be formed so as to have eight angled recesses R1-R8. Each of the angled recesses R1-R8 may have an angle λ of, for example, 30-60 degrees, in examples 45 degrees. The angled recesses R1-R8 of the push button 88 may be dimensioned and positioned to correspond with the angled flanges F1-F4 of the follower 82. Further, the push button 88 is slidably connected to the bottom portion 40b of the handle 40.

The engagement assembly 80 may further include a second spring 86 that is disposed around the shaft portion of the push button 88. This spring 86 provides a return force on the push button 88. One end of the spring may be configured to contact a bottom end 40b of the first handle cavity C1 and the opposing end of the spring 84 may be configured to contact the head portion of the push button 88. The spring 86 may have a smaller radius distance from the central axis A-A than the head portion. In this configuration, the spring 86 is adapted to urge the head portion toward the top portion 40a of the handle 40.

FIG. 3D shows a cross-section of the razor 300 in the first, vertically extended, configuration. As can be seen, flanges F1-F4 of the follower 82 are disposed within the long grooves G2, G4, G6, G8 in the first handle cavity C1. The spring 84 is extended and urges the follower 82 toward the bottom portion 40b of the handle 40. The angled flanges F1-F4 of the follower 82 are interlocked with the angled recesses R1-RA of the push button 88, thus the force from the spring 84 is transferred through the follower 82 to the push button 88. The push button 88 is held in an extended configuration, pushing against the lower end 70e of the flexible element 70. Further, the stiffness of spring 86 is less than spring 84, therefore when spring 84 urges the pushbutton 88 toward the bottom portion 40b of the handle 40, spring 84 compresses spring 86 between the head of the push button 88 and the bottom portion 40b of the handle 40.

When the push button 88 is depressed toward the top portion 40a of the handle 40, the spring 84 is compressed resulting in the follower 82 being dislodged from the long grooves G2, G4, G6, G8 while maintaining engagement with the angled recesses R1-R4 of the push button 88. When this occurs, the push button 88 pushes the follower 82 further into handle 40 by moving the shaft portion 42b of the follower 42 deeper into the second handle cavity C2.

Due to an offset of the position of the grooves G1-G8 in the first handle cavity C1 relative to the angled recesses R1-R8 of the push button 88, the angled tips of the flanges F1-F4 of the follower 82 slide along the surface of the angled recesses R1-R8 of the push button 88 and is thereby rotated about the vertical central axis A-A. The follower 82 rotates until the angled tips of the flanges F1-F4 are received in the deepest points of the coordinating angled recesses R1-R8. This rotation aligns the flanges F1-F4 with the short grooves G1, G3, G5, G7.

When the push button 88 is subsequently released, the spring 84 urges the follower 82 in the opposite direction, e.g. toward the bottom portion 40b of the handle 40. The push button 88 is also urged in this direction due to the force of the spring 84 that is translated through the follower 82. This motion continues until the ends of the flanges F1-F4 of the follower 82 contact the respective termination points T1, T3, T5, T7 of the short grooves G1, G3, G5, G7.

In this configuration, when the angled flanges F1-F4 are in contact with the termination positions T1, T3, T5, T7 of the short grooves G1, G3, G5, G7, the spring 84 is held in a compressed state. As a result, the push button 88 is not being forced in a vertically extended configuration by the spring 84 and follower 82. Additionally, in this configuration, the spring 86 urges the push button 88 toward the top portion 40a of the handle 40. In this "locked" position, the push button 88 is not pushing against the flexible element 70 and the flexible element 70 is free to be deformed along the at least one fold line 70c into the second, laterally extended, configuration. In this configuration, the flexible element 70 may form a frustum, where the first end 70a of the flexible element 70 has a larger radial distance from the vertical central axis A-A than the second end 70b of the flexible element 70.

In this configuration, the handle 40 can be balanced on the first end 70a of the flexible element 70 such that the handle 40 can stand in an upright position. Additionally, the housing 20 may be attached to the top end 42a of the handle 40 and the razor 300 may be able to balance in an upright position.

If the push button 88 is engaged again, the follower 82 is rotated such that the flanges F1-F4 are aligned with the long grooves G2, G4, G6, G8 and the razor 300 is returned to the first, vertically extended, configuration.

Although the described embodiments were provided as different exemplary embodiments, it is envisioned that these embodiments are combinable or, when not conflicting, the features recited in the described embodiments may be interchangeable.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A razor handle comprising a top portion for connection to a blade assembly and a bottom portion with a flexible element having at least two legs that are reversibly deformable between a first configuration and a second configuration, wherein the at least two legs present, in the second configuration, a broader footprint than in the first configuration, the broader footprint being configured for supporting the razor handle upright, and wherein
    the at least two legs extend towards the top portion of the handle in the first configuration with and extend away from the top portion of the handle in the second configuration.

2. The razor handle of claim 1, wherein the at least two legs comprise an elastomer.

3. The razor handle of claim 1, wherein the at least two legs have one or more fold lines for folding the at least two legs about the one or more fold lines from the first configuration to the second configuration.

4. The razor handle of claim 1, wherein the at least two legs are co-injection molded with the bottom portion of the handle.

5. The razor handle of claim 1, at least two legs extend from a first end to a second end, wherein the second ends are fixed to the bottom portion of the handle and the first ends extend farther away from the top portion of the handle when in the second configuration than in the first configuration.

6. The razor handle of claim 1, wherein a thickness of the at least two legs are variable along their length.

7. The razor handle of claim 1, wherein the at least two legs are shaped so as to adapt to a contour of the handle.

8. The razor handle of claim 1, further including a longitudinal axis extending from the bottom portion to the top portion, wherein with the at least two legs in the second configuration, the razor handle is configured to stand freely on a support surface so that the top portion is directly above the bottom portion and the longitudinal axis is substantially parallel to a gravitational force acting on the razor handle.

9. A razor comprising:
    the razor handle of claim 1; and
    a blade assembly configured to be attached to the top portion of the razor handle.

10. A razor comprising:
    a blade assembly including at least one blade, and
    a razor handle comprising a top portion for connection to the blade assembly and a bottom portion with a flexible element having at least two legs, the two legs being reversibly deformable between a first configuration and a second configuration, wherein the at least two legs present, in the second configuration, a broader footprint than in the first configuration, the broader footprint being configured for supporting the razor handle upright wherein the at least two legs extend towards the top portion of the handle in the first configuration with and extend away from the top portion of the handle in the second configuration.

11. A razor handle comprising a top portion for connection to a blade assembly and a bottom portion with a flexible element having at least two legs that are reversibly deformable between a first configuration and a second configuration, wherein the at least two legs present, in the second configuration, a broader footprint than in the first configuration, the broader footprint being configured for supporting the razor handle upright, and wherein the at least two legs extend from a first end to a second end, wherein the second ends are fixed to the bottom portion of the handle and the first ends extend farther away from the top portion of the handle when in the second configuration than in the first configuration.

* * * * *